S. M. FORT.
BROILER.
No. 172,410. Patented Jan. 18, 1876.
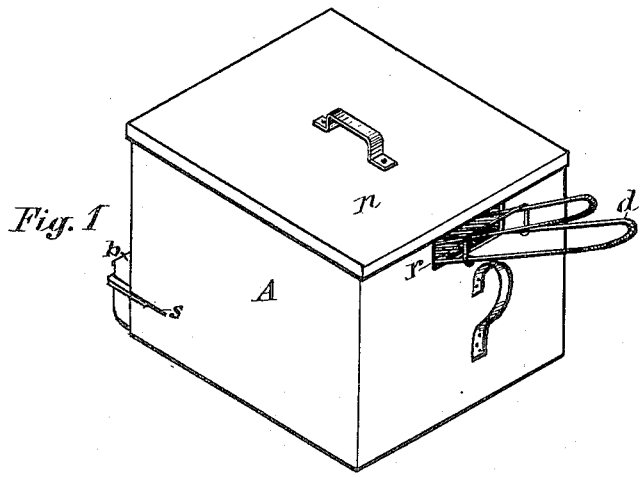
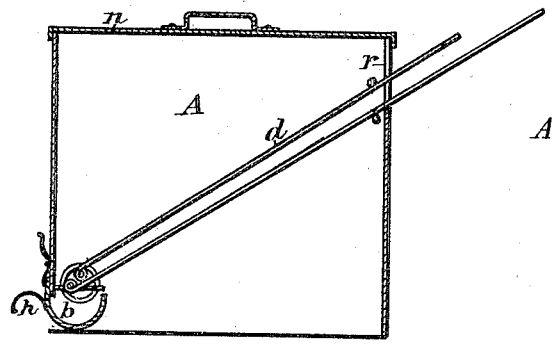
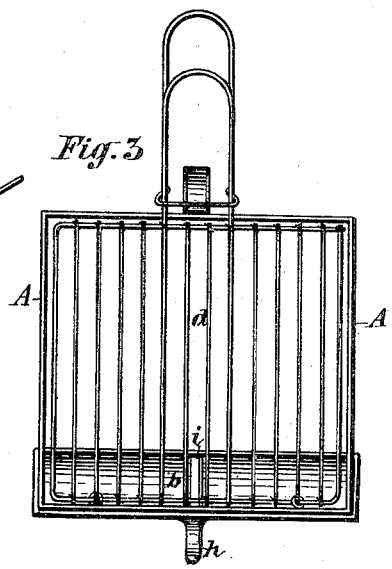

UNITED STATES PATENT OFFICE.

SIMON M. FORT, OF SYRACUSE, NEW YORK.

IMPROVEMENT IN BROILERS.

Specification forming part of Letters Patent No. 172,410, dated January 18, 1876; application filed December 10, 1875.

*To all whom it may concern:*

Be it known that I, SIMON M. FORT, of the city of Syracuse, in the county of Onondaga and State of New York, have invented new and useful Improvements in Broilers, of which the following, taken in connection with the accompanying drawing, is a full, clear, and exact description.

My invention relates to improvements in culinary vessels for broiling meat, adapted to be used on top of stoves or ranges, and directly over the fire, by which improvements the meat is more completely exposed to the heat, and the juice therefrom conveyed to a trough, which is situated in the vessel, so as to be protected from the fire, and arranged to be readily emptied and cleaned, all constructed substantially as hereinafter fully described.

In the accompanying drawing, Figure 1 is an isometric exterior view of my improved broiler; Fig. 2, a longitudinal section, and Fig. 3 a top view of the interior.

Similar letters of reference indicate corresponding parts.

A is a bottomless case or vessel, provided with the removable cover $n$. $b$ is the trough, having on the top edge of its end plates an outward flange, which fits horizontal slots $s$ near the bottom corner of the sides of the vessel A, as best seen in Fig. 1, where the trough is represented as being partly drawn out. The trough is inserted sidewise through an opening extending across the end of the vessel, and slides with the flanges on its ends in the slots $s$ aforesaid. The outside of the trough is increased in depth, so as to completely cover the opening in the vessel when attached, and prevents ingress of air. It is secured in its position by a button or other suitable means, and provided with a handle, $h$, to facilitate its removal and emptying.

By these improvements the trough is much quicker removed and attached than those that are inserted endwise, and by its position at the end or side of the vessel it is removed from over the fire, and, consequently, protected from excess of heat without the necessity of extra air-passages or other extra devices employed for that purpose.

$d$ is the gridiron or meat-holder, constructed, in the usual way, of two leaves of wire grates, having the bars running lengthwise. It is placed in an inclined position, or diagonally across the vessel A, with the end resting on brackets $i$, attached to the vessel above the trough, and its handle projecting through orifice $r$ in the opposite side.

It will be observed that by placing the meat-holder in this position in the vessel I expose the entire side of the meat to the fire, and at the same time convey the juice to a trough removed from the fire, where it is collected without danger of being overheated.

I do not claim a trough attached to or suspended from an oblique or inclined gridiron, nor when rigidly affixed to the case or vessel, as I am aware the same is not new.

What I claim as my invention, and desire to secure by Letters Patent, is—

1. The combination of the bottomless culinary vessel A, provided with the orifice $r$ at the top of one end, an opening extending across the bottom of the opposite end, and slots $s$ in its sides, and the trough $b$, of greater depth on the outside than on the inside of the case, to cover the opening at the bottom of the end of the vessel, and provided with outward flanges on the ends, fitting slots $s$, constructed substantially as described and shown, for the purpose set forth.

2. The combination of an inclosing-case for broiling meat, having a trough extending along the bottom of one of its sides, and attached thereto in the manner described, to admit of its ready removal, and a gridiron placed diagonally across the case or inclined toward the trough, and supported at its lower end above the trough by brackets affixed to the side of the case, substantially as and for the purpose specified.

3. The improved broiler herein described, consisting of the bottomless culinary vessel A, provided with the removable cover $n$ on top, the orifice $r$ at the top of one end, an opening extending across the bottom of the opposite end, and horizontal slots $s$ near the bottom corner of its sides, and, in connection with the last-mentioned opening, the trough $b$, of greater depth on the outside than on the inside of the case, and provided with the handle $h$ thereat, and outward flanges on the top of its end plates, fitted to slide in slots s, and the meat-holder d, placed diagonally in the vessel A, with its end resting on brackets above the trough, and the handle projecting through orifice r, all constructed and combined substantially as described and shown, for the purpose specified.

In testimony whereof I have signed my name and affixed my seal in the presence of two attesting witnesses, at Syracuse, in the county of Onondaga and State of New York, this 17th day of November, 1875.

SIMON M. FORT. [L. S.]

Witnesses:
 C. HOLMSTRUP, Jr.,
 C. H. HEY.